United States Patent Office 3,567,678
Patented Mar. 2, 1971

3,567,678
POLYMERS AND HAIR COLORING AND COMPOSITIONS COMPRISING THE SAME
Gregoire Kalopissis, Paris, France, assignor to L'Oreal, Paris, France
No Drawing. Continuation-in-part of application Ser. No. 459,498, Apr. 13, 1965, which is a division of application Ser. No. 227,542, Oct. 1, 1962. This application Apr. 10, 1967, Ser. No. 629,423
Claims priority, application France, Oct. 5, 1961, 875,144
Int. Cl. A61k 7/12; C08f 1/84
U.S. Cl. 260—41                                10 Claims

ABSTRACT OF THE DISCLOSURE

Water soluble colored polymers which have dye groups attached to the polymer chain by amide bonds and solubilizing groups for coloring hair.

---

This invention relates to water soluble polymer coloring agents that may be used to form improved hair coloring compositions.

This application is a continuation-in-part of application Ser. No. 459,498, filed Apr. 13, 1965, now abandoned which is a division of application Ser. No. 227,542, filed Oct. 1, 1962, now abandoned and claims the priority of French application Ser. No. 875,144 filed Oct. 5, 1961.

It is desirable to color hair in such manner that the duration of the dyeing effect on the hair coincides with the frequency of shampooing. One such coloring process is based on the use of solutions or dispersions of coloring substances in solutions, e.g. aqueous alcoholic solutions, of polymeric products which, after evaporation of the solvent in which the polymers have been dissolved, leave on each hair a film of the colored polymer. This film is water-soluble so that when the hair is shampooed, the deposit of polymer is dissolved away, so removing the initial dyeing effect imparted to the hair. In this process the solutions may be applied as such or in the form of aerosols.

The foregoing process has a number of disadvantages. For example the coloring products so brought into solution or dispersed in the polymers may exhibit some affinity for the hair itself so that incipient dyeing of the hair will occur. Furthermore, the solubility of the coloring substances in the medium of the polymer is not always good and when used in dispersions there is risk of the coloring substance separating out. Another problem with these prior art coloring compositions is they form unstable solutions, especially at the low concentrations in which they are used.

It is an important object of the present invention to provide new water soluble polymer coloring agents suitable for use in hair coloring compositions in which the foregoing disadvantages may be avoided.

Another important object of the present invention is to provide water soluble polymers which contain acid amide groups in which the amide nitrogen atom carries an amino aryl coloring substituent.

Another important object of the present invention is to provide improved water soluble polymers that are suitable for dyeing human hair.

The characteristic coloring component of the polymers of this invention has the following formula:

$$-CO-N(R')-R-HNR''$$

where R is a substituted or non-substituted arylene, R' and R'' is hydrogen or a substituted or non-substituted alkyl. The polymers of this invention thus have amide chains formed with the aid of the aromatic diamines having the formula:

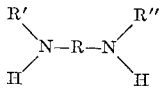

wherein R, R' and R'' have the meaning defined above. These diamines are the actual coloring agents.

Preferred polymers of this invention have the following formula:

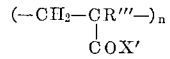

wherein R''' is a substance selected from the group consisting of hydrogen and methyl, X' is 10 to 90% halogen and 90 to 10% aromatic diamine of the formula:

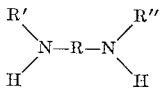

wherein R is selected from the group consisting of arylene and nitro-arylene and R', R'' each are selected from the group consisting of hydrogen, alkyl and dialkylaminoalkyl which forms amide branches in the polymer chain having the formula:

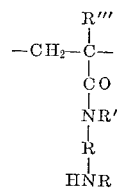

said halogen and said aromatic diamine being present in such proportions that the characteristic color of said aromatic diamine is imparted to the polymer coloring agent and said halide being present in such proportions that the polymer coloring agent can be converted to water soluble acid salts, and n is a high integer so that the molecular weight of said coloring agent is between 1000 and 10,000.

The polymers of this invention should have at least 10% of the acid amide groups substituted on the polymer chain to obtain the characteristic color of the diamine on the hair and up to 90% may be so substituted.

The polymers of this invention, including those prepared by Examples 1 to 5 are easily converted into water soluble polymers by placing them in a basic aqueous solution. This converts the unreacted acid halide to carboxylic acid and salifies the carboxylic acid. Any suitable base, such as sodium hydroxide may be used. The salts formed are soluble in water solutions having a pH of 7 or more. The preferred pH of the water solution is between 7 and 8. This salification step is preferably done before applying the polymer to the hair.

The most desirable combination of water solubility and hair dyeing properties are obtained in the polymers having 10 to 40% diamine substitution on the polymer chain.

Since the color imparting groups are chemically bound to and part of the new polymer chain migration of the color into the hair is avoided, and the new basic hair-coloring compositions obtained using solutions or dispersions of these polymers have improved stability. By studying the absorption spectrum of the coloring polymers it has been unexpectedly discovered that the color of the aromatic diamine moiety is not affected by the chemical linkage of the diamine to the above polymer molecule. The predictability of the hair color that will be obtained is an important feature of this invention.

The polymer coloring agents of the present invention may be produced by reacting an aromatic diamine comprising one or two primary or secondary amine groups with a polymer comprising acid halide functions of the formula —COX, in which X denotes a halogen, the reaction being effected in the presence of an agent assisting the elimination of hydrogen halide from the reactants.

Any known method of reacting the diamine with the acid chloride group of the polymer chain may be used. Furthermore, any compound or method that is known to eliminate hydrogen halide from a reaction zone may be used. For example, suitable compounds for removing the hydrogen halide formed in this reaction are pyridine, triethanolamine, and triethylamine.

In a preferred procedure for carrying out the process for the preparation of the colored polymers of the invention, there is employed a starting homopolymer, a compound of the general formula:

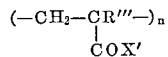

in which R''' has the meaning defined above, X is a halogen atom and $n$ is a high integer such that the molecular weight of the homopolymer is between 1,000 and 10,000.

A homopolymer particularly suitable for carrying out the process of preparation according to the invention is polyacrylyl chloride, of the formula:

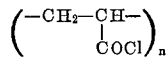

in which $n$ has the meaning defined above. This polymer is readily obtained by polymerizing acrylyl chloride in the presence of $\alpha,\alpha$-azo-bis-isobutyronitrile as a polymerization catalyst.

Any aromatic diamine coloring agents would be suitable for reaction with the aforesaid polymer starting materials. For example, nitroparaphenylenediamine, 1-methylamino-2-nitro-4-amino-benzene, 1-methylamino-2-nitro-4 ($\beta$-diethylaminoethyl) aminobenzene, 1-nitro-3-amino-4-($\beta$-diethylaminoethyl) amino-benzene, and 1,4-diaminoanthraquinone, and a wide range of other diamines may be employed.

Any one of a variety of known solvents may be used to conduct the reaction between the diamine and the acid halide on the polymer chain. For example, various acetone solvents, such as acetone, methylisobutylacetone, and methyl-ether-acetone, various aromatic solvents, such as benzene, toluene and xylene, and various aliphatic chlorides, such as chloroform, methylchloroform, etc., and other solvents such as dioxan may be used. A preferred solvent for the preparation of the colored polymers is anhydrous dioxan.

It should be noted that, in the condensation of polyacrylyl chloride with the aforesaid amines, the reactive acid chloride groups do not all react for various reasons, such as, for example, steric hindrance or slight hydrolysis of the acid chloride component. This incomplete reaction is encouraged by the molar quantities involved in the reaction in order to produce water soluble polymers. Haircoloring compositions using the polymers of this invention may consist simply of solutions of the colored polymer materials or they may contain additional other polymers, as desired. Thus, in order to increase the plasticity of the film coating the hair and the water solubility of the film to facilitate film removal, the colored polymers may be mixed, for example, with polyvinyl pyrrolidone or other polymers usually employed in the capillary art.

The following examples will serve to illustrate the invention:

EXAMPLE 1

90.5 g. of polyacrylyl chloride were dissolved in 2 litres of anhydrous dioxan. To this was added drop-by-drop, at room temperature, a solution of 229 g. of nitroparaphenylenediamine in 2 litres of dioxan which contained triethylamine in a proportion of 50.5 g./l. The triethylamine combined with and eliminated the hydrochloric acid which formed in the course of the reaction. Then the mol ratio of diamine to acid-chloride in the reaction mixture was 1.5 and the mol ratio of triethylamine to acid chloride grouping was 1.

The mixture stood for 48 hours at room temperature and the precipitate which formed was separated from the mixture, washed with dioxan to remove any excess uncondensed amine and washed with boiling water to remove the triethylamine hydrochloride formed. The polymer obtained, which had the following constitutional formula:

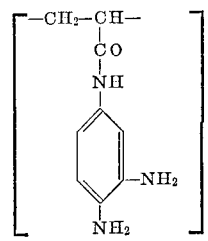

was thereafter dried in a vacuum.

The colored polymer obtained had the following analysis: Calculated (percent): N, 20.29. Found (percent): N, 8.11, which corresponded to a condensation yield of 40%.

EXAMPLE 2

Polyacrylyl chloride was reacted with 1-methylamino-2-nitro-4-aminobenzene under the conditions described in Example 1, the mol ratio of amine to acid-chloride was 1.5 and the mol ratio of triethylamine to acid-chloride was 1.

Analysis of the resulting colored polymer: Calculated (percent): N, 19.00. Found (percent): N, 4.75, which corresponded to a condensation yield of 25%.

EXAMPLE 3

Polyacrylyl chloride was reacted with 1-methylamino-2-nitro-4 ($\beta$-diethylaminoethyl)aminobenzene under the conditions described in Example 1, the mol ratio of amine to acid-chloride was 1.5 and the mol ratio of triethylamine to acid chloride was 1.

The colored polymer obtained had the following analysis: Calculated (percent): N, 17.50. Found (percent): N, 1.75, which corresponded to a condensation yield of 10%.

EXAMPLE 4

Polyacrylyl chloride was reacted with 1-nitro-3-amino-4-($\beta$-diethylaminoethyl)aminobenzene under the conditions described in Example 1, the mol ratio of amine to acid chloride was 1.5 and the mol ratio of triethylamine to acid chloride was 1.

The colored polymer obtained had the following analysis: Calculated (percent): N, 18.60. Found (percent): N, 6.13, which corresponded to a condensation yield of 33%.

EXAMPLE 5

Polyacrylyl chloride was reacted with 1,4-diamino-anthraquinone under the conditions described in Example 1, the mol ratio of amino to acid-chloride was 1.5 and the mol ratio of triethylamine to acid-chloride was 1. The colored polymer obtained had the following analysis: Calculated (percent): N, 8.1. Found (percent): N, 1.21, which corresponded to a condensation yield of 15%.

The colored polymers used in Examples 6 to 10 have been salified in the manner described above. These examples illustrate the use of the compounds of this invention as water soluble hair dyes.

EXAMPLE 6

The following mixture was prepared:

| | G. |
|---|---|
| Colored polymer of Example 5 | 0.5 |
| Alcohol q.s. for 100 cc. | |

To 20 parts of this mixture were added 50 parts of Freon 11 (trichlorofluoromethane) and 30 parts of Freon 12 (dichlorodifluoromethane). This mixture, sprayed onto white hair, left a mauve color when it dried. This color disappeared completely when the hair was washed. In this case, the lacquering effect on the hair was small; it was more pronounced in the examples which follow.

EXAMPLE 7

A mixture having the following composition was prepared:

| | G. |
|---|---|
| Polyvinyl pyrrolidone | 1.5 |
| Urea | 0.75 |
| Triethanolamine | 0.75 |
| Ethyl alcohol | 20.6 |
| Colored polymer of Example 5 | 0.1 |
| Water q.s. for 100 cc. | |

When applied to white hair, this aqueous alcoholic solution left a mauve shade when it dried. Shampooing the hair thus colored immediately removed the coloration.

EXAMPLE 8

The following mixture was prepared:

| | G. |
|---|---|
| Polyvinyl pyrrolidone | 11.8 |
| Colored polymer of Example 5 | 0.5 |
| Hydroxyethylenated lanoline | 0.88 |
| Alcohol q.s. for 100 cc. | |

20 parts of this composition were mixed with 50 parts of Freon 11, trichlorofluomethane and 30 parts of Freon 12, dichlorodifluoromethane in order to bring it into the form of an aerosol. The product when sprayed on the hair, left a mauve color which disappeared completely after shampooing.

EXAMPLE 9

Using the same conditions as in Example 7, but using the colored polymer product of Example 1, a mahogany hair coloration was obtained which disappeared completely after shampooing.

EXAMPLE 10

Using the same conditions as in Example 7, but using the colored polymer product of Example 4, a golden-yellow hair coloration was obtained which disappeared after shampooing.

What is claimed is:

1. Polymer coloring agents having the formula:

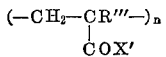

wherein R''' is selected from the group consisting of hydrogen and methyl, X' is 10 to 90 weight percent halogen or a water soluble carboxylic acid salt, and 90 to 10 weight percent aromatic diamine having the formula:

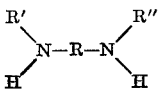

wherein R is selected from the group consisting of arylene and nitro-arylene and R', R'' each are selected from the group consisting of hydrogen, alkyl and dialkylaminoalkyl which forms amide branches in the polymer chain having the formula:

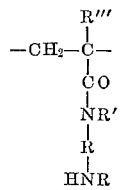

said halogen or acid salt and said aromatic diamine being present in such proportions that the characteristic color of said aromatic diamine is imparted to the polymer coloring agent and said halide being present in such proportions that the polymer coloring agent remains water soluble, or can be converted into a water soluble carboxylic acid salt, and n is a high integer so that the molecular weight of said coloring agent is between 1000 and 10,000.

2. The polymer of claim 1, wherein said aromatic diamine represents 10 to 40 weight percent of said X', and said halide or said acid salt represents 90 to 60 weight percent of said X'.

3. The polymer of claim 1, wherein said aromatic diamine is selected from the group consisting of nitro-paraphenylenediamine, 1 - methylamino - 2-nitro-4-aminobenzene, 1 - methylamino-2-nitro-4-($\beta$-diethylaminoethyl) amino-benzene, 1 - nitro-3-amino-4-($\beta$-diethylaminoethyl) aminobenzene, and 1,4-diaminoanthraquinone.

4. The polymer of claim 2, wherein said aromatic diamine is selected from the group consisting of nitro-paraphenylenediamine, 1 - methylamino - 2-nitro-4-aminobenzene, 1 - methylamino-2-nitro-4-($\beta$-diethylaminoethyl) amino-benzine, 1 - nitro-3-amino-4-($\beta$-diethylaminoethyl) aminobenzene, and 1,4-diaminoanthraquinone.

5. The polymer of claim 1, wherein the aromatic diamine is nitroparaphenylenediamine.

6. The polymer of claim 1, wherein the aromatic diamine is 1-methylamino-2-nitro-4-aminobenzene.

7. The polymer of claim 1, wherein the aromatic diamine is 1-methylamino-2-nitro-4-($\beta$-diethylamino-ethyl) aminobenzene.

8. The polymer of claim 1, wherein the aromatic diamine is 1-nitro-3-amino-4-($\beta$-diethylaminoethyl)-aminobenzene.

9. The polymer of claim 1, wherein the aromatic diamine reactant is 1,4-diaminoanthraquinone.

10. The polymer of claim 1, in which said halogen is chlorine.

References Cited

UNITED STATES PATENTS 3,025,219   3/1962   Maeder _____ 424—70

OTHER REFERENCES

Schulz et al.: Die Makr. Chemie., 42, pp. 197–204 (1960).

MORRIS LIEBMAN, Primary Examiner

H. H. FLETCHER, Assistant Examiner

U.S. Cl. X.R.

8—10.1, 10.2, 39; 260—80, 89.7; 424—70, 71